(12) United States Patent
Knibbe et al.

(10) Patent No.: US 9,924,578 B2
(45) Date of Patent: Mar. 20, 2018

(54) LIGHTING SYSTEM FOR A STADIUM

(71) Applicant: PHILIPS LIGHTING HOLDING B.V., Eindhoven (NL)

(72) Inventors: Engel Johannes Knibbe, Eindhoven (NL); Florian Stadler, Eindhoven (NL); Willem Piet Van Hoof, Eindhoven (NL); Michael David Simpson, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/503,265

(22) PCT Filed: Jul. 29, 2015

(86) PCT No.: PCT/EP2015/067417
§ 371 (c)(1),
(2) Date: Feb. 10, 2017

(87) PCT Pub. No.: WO2016/023754
PCT Pub. Date: Feb. 18, 2016

(65) Prior Publication Data
US 2017/0238396 A1    Aug. 17, 2017

(30) Foreign Application Priority Data

Aug. 14, 2014 (EP) .................................. 14180993

(51) Int. Cl.
*H05B 37/02* (2006.01)
(52) U.S. Cl.
CPC ......... *H05B 37/0227* (2013.01); *H05B 37/02* (2013.01)

(58) Field of Classification Search
CPC ...................................................... H05B 37/02
USPC ................ 315/152, 153, 291, 308, 312, 324
See application file for complete search history.

(56) References Cited

U.S. PATENT DOCUMENTS

| 5,544,030 A | 8/1996 | Wijbenga |
| 5,586,015 A | 12/1996 | Baldwin et al. |
| 8,255,487 B2 * | 8/2012 | Valois ................ H05B 37/0254 315/291 |
| 8,264,172 B2 * | 9/2012 | Valois ................ H05B 37/0254 315/291 |

(Continued)

FOREIGN PATENT DOCUMENTS

| WO | 2013103904 A1 | 7/2013 |
| WO | 2014115048 A1 | 7/2014 |

*Primary Examiner* — Thuy Vinh Tran (57) ABSTRACT

A light system for a stadium, the light system comprising: at least one sensor configured to determine light intensity values for multiple locations within the stadium; at least one electronically controllable luminaire configured to generate light directed towards at least one location of the multiple locations within the stadium based on a received control parameter; a controller configured to receive the light intensity values from the at least one sensor, further configured to determine a light intensity difference based on the light intensity values from the multiple locations within the stadium, and configured to select the at least one electronically controllable luminaire and generate the control parameter for the least one electronically controllable luminaire based on the light intensity difference to attempt to reduce the light intensity difference.

12 Claims, 7 Drawing Sheets

(56) References Cited

U.S. PATENT DOCUMENTS

| | | |
|---|---|---|
| 8,523,397 B1 | 9/2013 | Gordin |
| 8,860,316 B2 * | 10/2014 | Barrilleaux ........ H05B 37/0245 |
| | | 315/152 |
| 2002/0154506 A1 | 10/2002 | Wijbenga et al. |
| 2002/0172038 A1 | 11/2002 | Dicken et al. |
| 2006/0175987 A1 | 8/2006 | Gordin et al. |
| 2011/0121654 A1 | 5/2011 | Recker et al. |

* cited by examiner

LIGHTING SYSTEM FOR A STADIUM

CROSS-REFERENCE TO PRIOR APPLICATIONS

This application is the U.S. National Phase application under 35 U.S.C. § 371 of International Application No. PCT/EP2015/067417A1, filed on Jul. 29, 2015 which claims the benefit of European Patent Application No. 14180993.9, filed on Aug. 14, 2014. These applications are hereby incorporated by reference herein.

FIELD OF THE INVENTION

This invention is generally related to a light or lighting system and method, and in particular a lighting system with lighting intensity homogeneity control which is compatible with arena or stadium lighting systems.

BACKGROUND OF THE INVENTION

In high-end arena (field, pitch or stadium) lighting, like the Philips ArenaVision products, a large number of luminaires are distributed around an arena or stadium to attempt to create a uniform light intensity on the field or pitch. For example a football stadium may have a lighting plan or design where the lighting system contains more than 100 luminaires each located on the stadium and with a desired aiming point on the pitch to attempt to provide a suitable lighting effect. In stadiums and arenas the sports area is lit by so-called pitch lighting to create a well-lit environment. Especially for broadcasted events like Olympics or world championships in soccer or rugby the homogeneity of the lighting from various angles (related to spectator positions but even more important to camera positions) is a key requirement in the design. Typically the lighting system planner generates a light plan which contains for each luminaire information, such as the type of luminaire, the mounting location and orientation of the luminaire, and the aiming point (typically relative to the centre of the sports area). This lighting plan attempts to generate the uniform or homogeneous lighting effect. The homogeneity requirements are typically met by a combination of luminaires with narrow and wider beam angles that cover the whole field or sports area from various angles. The design of the luminaire layout and angles is currently a manual activity, supported by software tools that calculate the average, minimum, and maximum light levels on the pitch based on the luminaires, their positions (X, Y, Z) relative to the sports area, their exact direction, and the optics employed. The creation of good homogeneous pitch lighting with as few luminaires as possible is still a creative art of experts.

Based on the lighting plan the installer mounts the luminaires in the stadium infrastructure. In this phase, the installer also has to direct the luminaire at the desired aiming location in the field using the lighting plan orientation values as defined in the lighting plan.

From the luminaire location, the installer has a clear overview of the field but it is very difficult to accurately determine the aiming spot. The alignment of the luminaires is prone to errors and the beam patterns generated by the luminaires may be difficult to align and combine to provide the expected or desired homogeneous lighting effect. There have been several approaches to attempt to overcome such issues. U.S. Pat. No. 5,586,015 for example addressed the same problem of creating homogeneity of lighting on a sports field by providing a reflector for a HID light fixture wherein, by the orientation and positioning of the lamp within the reflector, an essentially oval shaped light pattern is generated. When projected onto the playing surface of a sports field, the oval shaped light pattern translates to an essentially circular shaped pattern which allows for a more uniform and efficient overlapping of the multiple light outputs at the playing field level. However such a method does not enable the fine tuning of an implemented lighting plan to provide a homogeneous lighting effect. Furthermore such a system would be difficult to control once implemented.

SUMMARY OF THE INVENTION

The above concerns are addressed by the invention as defined by the claims.

According to an embodiment of the invention, there is provided a light system for a stadium, the light system comprising: at least one sensor configured to determine light intensity values for multiple locations within the stadium; multiple electronically controllable luminaires, wherein at least one electronically controllable luminaire is configured to generate light directed towards at least one location of the multiple locations within the stadium based on a received control parameter; a controller configured to receive the light intensity values from the at least one sensor, further configured to determine a light intensity difference based on the light intensity values from the multiple locations within the stadium, and configured to select the at least one electronically controllable luminaire and generate the control parameter for the least one electronically controllable luminaire based on the light intensity difference to attempt to reduce the light intensity difference.

In such embodiments the light system may overcome possible light intensity homogeneity differences by the controller being configured to control the electronically controllable luminaire using a suitable control parameter. The control parameter is generated based on a light intensity value difference based on the light intensity values from multiple stadium locations. In such a way a control loop for controlling the light system may overcome lighting failures and faults in situ as well as enable fine tuning of practically implemented lighting systems. The examples described herein feature multiple locations and a light intensity difference based on the light intensity values from the multiple locations. Light intensity differences or light intensity derivations from any multiple locations may furthermore define a volume or area. It would be understood that the light intensity difference value may be calculated by the difference between measured light intensity values or by determining a difference value by comparing the measured light intensity value against an absolute or reference value.

The light intensity difference may be an area or volume light intensity difference generated by combining the light intensity differences between pairs of light intensity values. In such a manner the light intensity differences of the multiple locations may be used to generate a closed loop system where the stadium lighting is controlled across the whole of the area or volume being monitored by the sensor. Furthermore the effect of adjacent location light differences or errors may be enhanced in such embodiments.

The controller may be configured to determine a combined light intensity difference by combining multiple light intensity differences based on the light intensity values from a number greater than two locations within the stadium, and further configured to generate control parameters for the electronically controllable luminaires illuminating the locations within the stadium based on the combined light intensity difference.

The light intensity value for each location may comprise at least two directional components representing the light intensity as sensed from two separate directions respectively, and the light intensity difference is based on a difference between a combination of the light intensity values for each location from each direction.

The combination of the light intensity values for each location from each direction may comprise: a linear or non-linear combination of the light intensity values for each location to generate a single light intensity value for each location;

an appending of the light intensity values for each location to generate an array of light intensity value directional components for each location. In such embodiments as described herein the sensors and controller are configured to control the operation of the luminaires based on a directional lighting intensity differences rather than a general lighting intensity and therefore able to control the lighting such that the lighting intensity is homogeneous from more than a single direction or viewpoint and therefore able to correct for shadowing and reflective surfaces generating specific directional effects.

The at least one sensor may comprise at least two cameras, each camera located at a different known position within the stadium and configured to view the multiple locations from different viewing orientations such that each camera is configured to determine a light intensity value directional component for each location. In such a manner by capturing images from different viewpoints within the stadium, each location may have multiple light intensity values associated with each of the multiple locations permitting a more sophisticated light homogeneity control to be performed.

The multiple locations within the stadium may be separated by at least one of: a horizontal distance; a vertical distance. In other words the homogeneity may be determined over any suitable direction and therefore over a volume rather than an area of the field or pitch.

The at least one sensor may comprise a camera mounted substantially over a stadium pitch surface, wherein the camera may be configured to capture an image of at least part of the stadium containing the multiple locations, and wherein the image comprises a light intensity value for each location. The cameras may therefore in some embodiments generate the light intensity values for the locations within the stadium from the viewpoint of the TV cameras used to record and capture events within the stadium. The light intensity value may be based on at least one pixel brightness value from the image, the at least one pixel from the image may be associated with the location. The light intensity value may be based on at least one pixel black and white brightness (luma) value from the image, the at least one pixel from the image may be associated with the location. In such embodiments the colour components of the image value do not contribute to the light intensity value and thus effects such as multiple surfaces having various reflection coefficients may be allowed for. In such a manner a single camera, typically present in most stadia, may be employed as a light sensor to determine the light intensity values for the stadium pitch surface and so enable a system to be created without the need for additional sensors to be deployed. Furthermore the single camera array of light intensity values may be arranged in any suitable manner. For example the light intensity value array may be arranged as groupings of pixels of the captured image associated with a grid of 5×5 m squares of pitch surface.

The at least one sensor may comprise at least one of: at least two photo-sensors located on a structure at different heights and configured to determine light intensity values for at least two locations separated by a vertical distance within the stadium; and at least two directionally orientated photo-sensors located on the same horizontal plane on a mannequin, the mannequin being configured to be moved on the surface of the stadium between the multiple locations and the photo-sensors being configured to determine directional light intensity values for multiple locations separated by a horizontal distance within the stadium. In such embodiments the at least one sensor is implemented by at least one photo-sensor or photodetector. In such a manner a simpler and cheaper control or calibration system may be implemented. It will be understood that there are many suitable types of photo-sensors such as photodiodes, photoresistors or light dependent resistors (LDR) which change resistance according to light intensity, photovoltaic cells which produce a voltage and supply an electric current when illuminated, and phototransistors. Furthermore the photo-sensor may in some embodiments be movable to cover multiple locations within stadium, or there may be multiple photo-sensors configured to monitor the multiple locations. In some embodiments the photo-sensors may be located on a structure at different heights to permit light intensity values for vertical and/or horizontal locations and therefore enable control of light intensity homogeneity for a volume of space rather than over an area to be performed.

The controller may be configured to generate the control parameter for the least one electronically controllable luminaire to minimise the light intensity difference.

The controller may be configured to combine light intensity values associated with at least one location of the multiple locations in the stadium to generate a combined light intensity value associated with the at least one location of the multiple locations within the stadium, and wherein the light intensity difference based on the light intensity values from the multiple locations within the stadium may be determined based on the combined light intensity value associated with the at least one location of the multiple locations. In such embodiments the controller is able to process or combine the multiple images from the locations of the camera. Each image may therefore comprise a light intensity value of a location within the stadium, and by combining the multiple light intensity values associated with each location generate a more sophisticated light intensity difference value. For example in some embodiments the image light intensity value for a location is generated based on an average of the pixel brightness values associated with the location within the stadium taken from images at multiple camera viewpoints. Furthermore in such embodiments the combination may be a linear combination where the directional components such as the lighting intensity components or the lighting intensity difference components (for each direction) are added. However a lighting intensity component or lighting intensity difference combination may be implemented as a non-linear combination where a first direction light intensity (difference) has a higher weighting then the second direction light intensity (difference). Furthermore it would be understood that the light intensity difference may be a linear difference $(b_1-b_2)$ where $b_1$ and $b_2$ are the intensity levels for the first and second location, or a non-linear difference such as a quadratic (Euclidean) difference $(b_1^2-b_2^2)$ or logarithmic difference.

The at least one electronically controllable luminaire may comprise at least one of: a dimmable luminaire; a movable luminaire; a beam position adjustable luminaire; and a beam width adjustable luminaire.

The controller may comprise a memory configured to store an identity or address of the at least one electronically controllable luminaire and at least one parameter associated with the at least one electronically controllable luminaire, wherein the at least one parameter associated with the at least one electronically controllable luminaire comprises at least one of: current location of the at least one electronically controllable luminaire; current dim level of the at least one electronically controllable luminaire; current direction of beam of the at least one electronically controllable luminaire; and current width of beam of the at least one electronically controllable luminaire, and wherein the controller may be configured to generate the control parameter for the least one electronically controllable luminaire based on the light intensity difference and the at least one parameter associated with the at least one electronically controllable luminaire.

The controller may be configured to output the control parameter for the at least one controllable luminaire based on the identity or address of the at least one electronically controllable luminaire. It would be understood that in such embodiments the identity or the address of the luminaire would be defined in the lighting plan as identifying a position of the luminaire, the orientation of the luminaire and furthermore the aiming point of the luminaire. Therefore based on this information the controller may determine which luminaire and which luminaire parameter(s) may be adjusted to reduce or minimise the light intensity difference based on the light intensity values from the locations.

The controller may be configured to further receive light intensity values from the at least one sensor after generating the control parameter, to further determine an additional light intensity difference based on the further light intensity values from the multiple locations within the stadium, and to generate a further control parameter for the least one electronically controllable luminaire or a control parameter for a further electronically controllable luminaire based on the additional light intensity difference to reduce the light intensity difference based on the light intensity values from the multiple locations, and to repeat the further receiving, further determining and generating until the additional light intensity difference is below a threshold value. It would be understood that in some embodiments the threshold value may be any suitable value and may be a single value, an absolute value, a relative value to one of the light intensity values, a vector value with components reflecting the different thresholds for lighting intensity differences sensed from different directions.

According to a second aspect there is provided a method for controlling a light system for a stadium, the method comprising: determining light intensity values for multiple locations within the stadium using at least one sensor; determining a light intensity difference based on the light intensity values from the multiple locations within the stadium; selecting at least one electronically controllable luminaire and generating at least one control parameter for at least one electronically controllable luminaire based on the light intensity difference; generating light directed towards at least one location of the multiple locations based on the at least one control parameter using at least one electronically controllable luminaire, wherein the at least one control parameter is generated to attempt to reduce the light intensity difference based on the light intensity values from the multiple locations.

Determining the light intensity difference may comprise determining an area or volume light intensity difference by combining the light intensity differences between pairs of light intensity values.

Determining the light intensity values may comprise determining at least two directional components for each location, each directional component may represent the light intensity as sensed from a separate direction, and wherein determining the light intensity difference may comprise determining a light intensity difference based on a difference between a combination of the light intensity values for each location from each direction.

Combining the light intensity values for each location from each direction may comprise: generating a linear or non-linear combination of the light intensity values for each location in order to generate a single light intensity value for each location; appending of the light intensity values for each location in order to generate an array of light intensity value directional components for each location. The method may further comprise outputting the parameter for the at least one electronically controllable luminaire based on the identity or address of the at least one electronically controllable luminaire.

Generating the at least one control parameter may comprise generating the control parameter for the least one electronically controllable luminaire to minimise the light intensity difference based on the light intensity values from the multiple locations.

Determining light intensity values for multiple locations within the stadium using at least one sensor may comprise capturing an image of at least part of the stadium containing the multiple locations using a camera, wherein the image may comprise a light intensity value for each of the multiple locations.

The light intensity value may be based on at least one pixel brightness value from the image, the at least one pixel from the image may be associated with the location. The light intensity value may be based on at least one pixel black and white brightness (luma) value from the image, the at least one pixel from the image may be associated with the location.

Capturing an image of at least part of the stadium containing the multiple locations using a camera, wherein the image may comprise a light intensity value for each of the multiple locations may comprise capturing an image using at least one camera mounted substantially over a stadium pitch surface, the image may comprise an array of light intensity values associated with the multiple locations.

Capturing an image of at least one part of the stadium may comprise capturing at least two images from at least two cameras respectively, each camera being located at a different known position within the stadium, wherein each image from a respective camera may comprise a light intensity value associated each of the multiple locations from a defined direction.

The method may comprise combining light intensity values as sensed from defined directions associated with at least one location of the multiple locations in the stadium to generate a combined light intensity value associated with the at least one location of the multiple locations within the stadium, and generating the light intensity difference based on the light intensity values from the multiple locations may comprise determining a light intensity difference based on the combined light intensity value associated with the at least one location of the multiple locations.

Determining light intensity values for multiple locations within the stadium using at least one sensor may comprise one of: determining directional light intensity values for the multiple locations within the stadium using at least two directionally orientated photo-sensors configured to be moved between the multiple locations; and determining directional light intensity values for the multiple locations within the stadium using at least two directionally orientated photo-sensors located on a mannequin.

Determining light intensity values for multiple locations within the stadium using at least one sensor may comprise determining at least two directional components representing the light intensity as sensed from two separate directions respectively.

Determining a light intensity difference based on the light intensity values from the multiple locations within the stadium may comprise determining a light intensity difference comprising at least two directional difference components representing the difference in the light intensity as sensed from two separate directions respectively.

Generating at least one control parameter for at least one electronically controllable luminaire based on the light intensity difference may comprise generating the control parameter to minimise a combination of a light intensity difference based on the light intensity values from the multiple locations as sensed from a first direction and a light intensity difference based on the light intensity values from the multiple locations as sensed from a second direction. The combination of the light intensity difference based on the light intensity values from the multiple locations as sensed from a first direction and a light intensity difference based on the light intensity values from the multiple locations as sensed from a second direction may comprise a combination with a first weighting factor associated with the light intensity difference based on the light intensity values from the multiple locations as sensed from a first direction and a second weighting factor associated with the light intensity difference based on the light intensity values from the multiple locations as sensed from a second direction.

The multiple locations within the stadium may be separated by at least one of: a horizontal distance; a vertical distance.

The at least one electronically controllable luminaire may comprise at least one of: a dimmable luminaire; a movable luminaire; a beam position adjustable luminaire; and a beam width adjustable luminaire.

The method may comprise: storing an identity or address of the at least one electronically controllable luminaire; and storing at least one parameter associated with the at least one electronically controllable luminaire, wherein the at least one parameter associated with the at least one electronically controllable luminaire may comprise at least one of: current location of the at least one electronically controllable luminaire; current dim level of the at least one electronically controllable luminaire; current direction of beam of the at least one electronically controllable luminaire; and current width of beam of the at least one electronically controllable luminaire, wherein generating at least one control parameter may comprise generating the control parameter for the least one electronically controllable luminaire based on the light intensity difference and the at least one parameter associated with the at least one electronically controllable luminaire.

The method may comprise outputting the control parameter based on the identity or address of the at least one electronically controllable luminaire.

The method may comprise: receiving further light intensity values from the at least one sensor after generating the control parameter; determining an additional light intensity difference based on the light intensity values from the multiple locations within the stadium from the further light intensity values; generating a further control parameter for the least one electronically controllable luminaire or a control parameter for a further electronically controllable luminaire based on the additional light intensity difference; and repeating the receiving, determining and generating until the additional light intensity difference is below a threshold value.

According to a third aspect there is provided a light system for a stadium, the light system comprising at least one processor and at least one memory including computer program code for one or more programs, the at least one memory and the computer program code configured to, with the at least one processor, cause the commissioning system at least to: determine light intensity values for multiple locations within the stadium using at least one sensor; determine a light intensity difference based on the light intensity values from the multiple locations within the stadium; select at least one electronically controllable luminaire and generating at least one control parameter for at least one electronically controllable luminaire based on the light intensity difference; generate light directed towards at least one location of the multiple locations based on the at least one control parameter using at least one electronically controllable luminaire, wherein the at least one control parameter is generated to attempt to reduce the light intensity difference based on the light intensity values from the multiple locations.

Determining the light intensity difference may cause the system to determine an area or volume light intensity difference by combining the light intensity differences between pairs of light intensity values.

Determining the light intensity values may comprise determining at least two directional components for each location, each directional component may represent the light intensity as sensed from a separate direction, and wherein determining the light intensity difference may cause the system to determine a light intensity difference based on a difference between a combination of the light intensity values for each location from each direction.

Combining the light intensity values for each location from each direction may cause the system to: generate a linear or non-linear combination of the light intensity values for each location in order to generate a single light intensity value for each location; append the light intensity values for each location in order to generate an array of light intensity value directional components for each location.

The system may further be caused to output the parameter for the at least one electronically controllable luminaire based on the identity or address of the at least one electronically controllable luminaire.

A computer program product comprising a computer-readable storage medium having computer-readable program code, when executed on at least one processor of a computer, may cause the computer to implement the steps of the method as described herein.

BRIEF DESCRIPTION OF THE DRAWINGS

Examples of the invention will now be described in detail with reference to the accompanying drawings, in which.

DETAILED DESCRIPTION OF THE EMBODIMENTS

The concepts as described with respect propose the implementation of lighting intensity homogeneity measurement and control apparatus in combination with individually electronically controllable (for example individually dimmable) pitch or field lighting luminaires. Although the following example have been described with respect to stadium or arenas such as football stadia, it would be understood that the apparatus and methods described herein could be applied to various large scale lighting applications such as lighting for swimming pool arenas and velodromes. Thus the term "arena" or "stadium" within the document and the claims herein should be interpreted broadly to cover any architectural or façade lighting system. Such architectural or façade lighting system may illuminate a surface, which surface may be the ground, water, a structure, or any other surface that may receive illumination from the lighting system. The surface may be flat, curved, tilted, rough, smooth, or have any features. The surface may be a naturally occurring surface or may be manmade. The surface may include a road, highway, stadium, parking lot, fields, park, farms, land, forest, runway, warehouse, port, refinery, rig, ship, gas station, railway, interchanges, toll plazas, container yards, truck stops, correctional facilities, airports, security areas, sports locations, or any other surface. The lighting system may be provided indoors or outdoors. In some instances, the lighting units may be used in indoor high bay applications.

Figure 1:
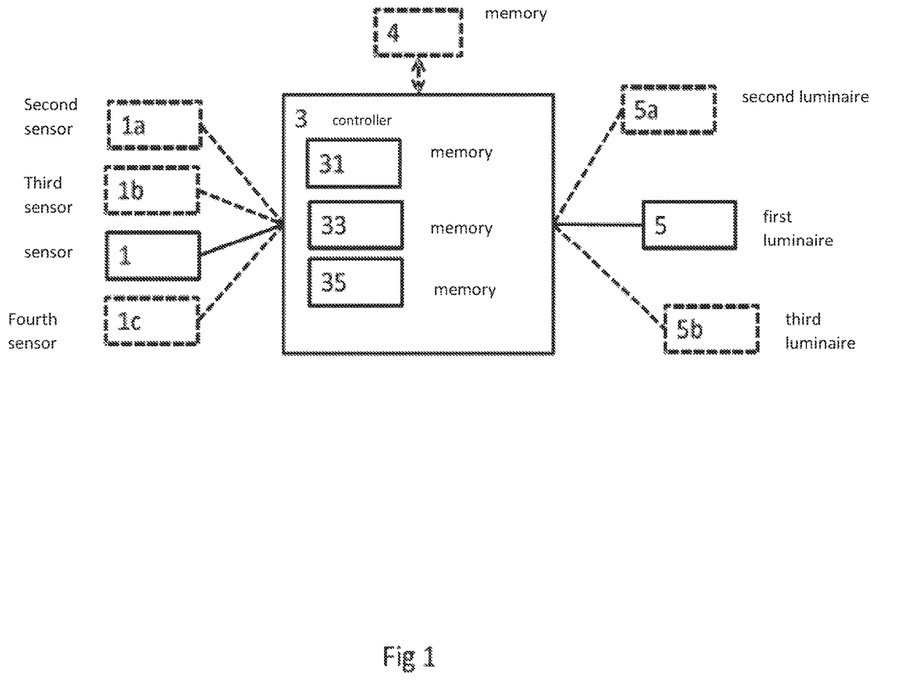
FIG. 1 shows schematically an example lighting system according to some embodiments.

With respect to FIG. 1 an example lighting system is shown according to some embodiments. The lighting system shown in FIG. 1 comprises at least one light sensor 1. The light sensor may be any sensor, grid or array of sensors configured to determine light intensity values for multiple locations within the stadium. In the example shown herein the lighting system comprises four light sensors, a first light sensor 1, a second light sensor 1a, a third light sensor 1b, and a fourth light sensor 1c. As described herein each light sensor may in some embodiments be configured to monitor or determine the light intensity level for one or more locations within the stadium. For example in some embodiments each light sensor may determine the light intensity levels for a range of locations or for a single location. Furthermore in some embodiments the light sensor is an omnidirectional sensor and thus configured to determine a light intensity value which is not defined relative to a direction. In some embodiments the light sensor is a directional sensor and thus determines a light intensity value relative to a direction. In some embodiments the light sensor is configured to determiner a light intensity value for more than one direction. It would be understood that in some embodiments at least one of the locations may be a 'reference' location, in other words a location with a reference light intensity value against which other locations are monitored. This 'reference' location may for example be the centre spot (of the field or pitch). The light sensor 1 may be configured to pass the light intensity values to a controller 3 according to any known manner. Generally light levels are discussed with respect to horizontal and vertical light levels. Meaning a light sensor is adapted to sense the light levels in a horizontal, or vertical plane. In the case of a horizontal light sensor, a xy position has only one value. In the case of vertical light sensor it may depend on in which direction (out of 360 degrees) the sensor is oriented. It is understood that a target for a stadium lighting system is to provide a good horizontal and vertical illumination of the pitch for each location. The vertical illumination may mainly be determined for the various camera positions used on and around the pitch.

In some embodiments the lighting system comprises a controller 3. The controller 3 is configured to receive the light intensity values from the light sensor and determine a light intensity difference based on the light intensity values from the measured locations. In some embodiments the controller may determine the light intensity difference value by comparing or determining a difference between measured light intensity values or by determining a difference value by comparing the measured light intensity value against an absolute or reference value.

The controller 3 having determined at least one light intensity difference between multiple locations within the stadium may then be configured to generate control parameters for at least one electronically controllable luminaire based on the light intensity difference. In some embodiments the control parameter is configured to reduce the light intensity difference between the multiple locations. Furthermore in some embodiments the control parameter is generated to minimise the light intensity difference between the multiple locations.

In some embodiments the controller 3 may comprise a light intensity difference determiner 31. In some embodiments the controller 3 and specifically the light intensity difference determiner 31 may determine either a relative light intensity difference, in other words comparing pairs or groups of multiple locations within the stadium. In some embodiments the light intensity difference is determined by comparing the light intensity values against a reference or absolute value. In some such embodiments a reference light intensity value is determined or chosen (or assigned to one of the locations) and the difference value determined based on this reference light intensity value. In some embodiments the controller 3 and specifically the light intensity difference determiner 31 may be configured to determine a light intensity difference based a stadium wide or 'area' light intensity difference value. This stadium wide or 'area' light intensity difference may be determined by combining the light intensity differences. The combination of the light intensity differences may generate a 2D or 3D mapping of the light intensity or light intensity differences within stadium enabling the controller 3 to adapt the lighting units or luminaires to reduce these differences. In some embodiments the combination, for example a stadium wide light intensity difference value, may be generated by summing the absolute light intensity differences between pairs or groups of measured intensity values to determine the degree of lighting homogeneity and whether any adjustment or control is required. This may for example be implemented by measuring the lighting intensity over the stadium 'surface' or 'volume'. Following the measurement then determining or quantifying any local dip or peak and a stadium wide homogeneity in the lighting intensity based on the measurements over the stadium. Then, following the determining of the local dip or peak and stadium wide homogeneity, enabling a correction or control to adjust the local dips or peaks to increase the stadium wide lighting intensity homogeneity until a homogeneity threshold is met.

In some embodiments the difference values from a multitude of measurements (at locations on the pitch), are determined where the differences are biased such that any light difference or error between two adjacent or neighbouring locations produces a larger overall difference value when compared to any difference between remote or distant locations. This is because adjacent or neighbouring errors are easily 'seen' by the observer.

In some embodiments the light intensity difference value is a single (scalar) value. For example the controller 3 and specifically the light intensity difference determiner 31 may be configured to determine a light intensity difference value by subtracting one light intensity value for a first location from a light intensity value for a second location. However it would be understood that the difference may be generated according to a Euclidean distance, in other words squaring the first light intensity value, squaring the second light intensity value and then subtracting the two squared light intensity values and then optionally performing a square root operation on the output. In some embodiments the difference is determined based on a logarithmic distance.

The light intensity difference determiner 31 may furthermore be configured to receive light intensity values which comprise directional components, or light intensity values for a location measured from different directions. For example where the light intensity values comprise a vector of directional components (X, Y, Z) then the light intensity difference value may also comprise a vector of directional components. In some embodiments the controller 3 and specifically the light intensity difference determiner 31 may be configured to combine the vector components to generate a single scalar light intensity difference value associated with the pair of locations. In such embodiments the combination of the directional components to form a scalar light intensity difference value may be generated by applying equal weighting to the directional components. However the combination of the directional components may be performed by applying an unequal weighting to the directional components. For example the light intensity difference in value for the vertical direction (Z) may have a lower weighting than the light intensity difference values for the horizontal directions (X, Y). The light intensity difference determiner 31 may be configured to output the light intensity difference value to a luminaire chooser 33 such as discussed below.

In some embodiments the controller 3 may comprise a luminaire chooser 33. The luminaire chooser 33 may in some embodiments receive the light intensity difference value and select or chose a suitable luminaire to be controlled. The luminaire chooser 33 in some embodiments may select or choose the suitable luminaire based on the locations (or positions) over which the light intensity difference value has been determined. This may be implemented in some embodiments by the luminaire chooser 33 being configured to communicate with a memory 4, which contains the lighting plan or information based on the lighting plan. In the example shown herein the memory is external to the controller, however it would be understood that the memory or the storage means containing the lighting plan or information based on the lighting plan may be within the controller. The lighting plan or information based on the lighting plan may for example define or identify an identity or address associated with a luminaire, the luminaire aiming position or location, the mounting location of the luminaire and the orientation of the luminaire. In other words the information may determine the aiming point and furthermore the direction from which the light generated by the luminaire is directed. In some embodiments the memory 4 may further comprise information defining the luminaire current operating parameters such as: luminaire intensity (or dim value), the luminaire orientation (and therefore the luminaire current beam aim), and the luminaire beam width. The luminaire chooser 33 and the memory 4 may therefore be configured to operate as a lookup table where the input is the location of a lighting intensity difference (and direction) and the output is a suitable luminaire associated with the location (and direction), and the current operating parameters associated with the luminaire and may pass this to the control parameter generator 35 such as discussed below.

In some embodiments the controller 3 may comprise a control parameter generator 35. In some embodiments the control parameter generator 35 receives the selected or chosen luminaire and current operating parameters and generates a control parameter to reduce or minimise the light intensity difference. Example control parameters which could be generated are for example luminaire intensity (dim values), luminaire orientation(s) (and so move the aiming spot or location of the luminaire), luminaire beam width, and luminaire beam shape. The control parameter generator 35 may in some embodiments generate and output the control parameter as a suitable message. For example the control parameter generator 35 may be configured to generate a message according to a known lighting control protocol such as DMX, RDM, or Art-Net. In some embodiments the control parameter generator 35 may further be configured to interface with the memory 4 to update the new operating parameter for the chosen luminaire based on the generated control parameter output.

In some embodiments the lighting system comprises at least one luminaire 5 which may be any suitable luminaire type and configuration. In the example shown in FIG. 1 three luminaires are shown, a first luminare 5, a second luminaire 5a and a third luminaire 5b. However it would be understood that there may be any suitable number of luminaires employed and controlled as described herein. In the following examples the control of the first luminaire 5 is described however it would be understood that the same methods may be implemented with respect to the other luminaires located within the stadium. The luminaire 5 is mounted within the stadium via a suitable mounting point or jig and orientated at an aiming point or spot based on an orientation or orientations about the mounting point. Furthermore in some embodiments the mounting point or jig may be configured to be adjustable in order to change the orientation(s) of the luminaire. This adjustment in some embodiments is a one, two or three dimensional adjustment. Suitable adjustments may be any combination of the following: an orientation about a horizontal axis (a tilt adjustment); an orientation about a vertical axis (a pan adjustment); and an orientation about the optical axis of the luminaire (a roll adjustment). In some embodiments the luminaire 5 comprises (or is coupled to) a motor configured to provide the adjustable orientation(s) about the mounting point or jig. The luminaire 5 or optics coupled to the luminaire 5 may further be configured to produce a beam width or pattern. In some embodiments the luminaire 5 or optics coupled to the luminaire 5 may be electronically controlled to produce a variable or adjustable beam width or shape. Furthermore the luminaire 5 may be configured to be able to produce variable or adjustable light intensity. For example in some embodiments the luminaire 5 is a LED Flood lighting luminaire which may be dimmed. In some embodiments the luminaire 5 is coupled to the controller 3 and configured to receive control signals in the form of control parameters which affect at least one of the variable or adjustable elements of the luminaire.

In some embodiments the controller 3 may furthermore monitor the light intensity values and furthermore the light intensity difference values following an adjustment or control of the luminaire to determine whether any further adjustment or control is required. For example in some embodiments the light intensity difference (either for the pair of locations, the area or volume, or stadium wide) is compared against a threshold value. When the threshold value is met, and the light intensity difference is below the threshold (in other words a sufficient homogeneity has been met), then the controller may stop, or move on to the next pair, area or volume. In some embodiments the controller after stopping may be restarted after a determined time period (to check whether any of the luminaires have 'drifted' off their expected performance parameters and therefore causing lighting problems), or may operate in a standby mode of continually monitoring for any new light intensity differences. Although the controller is shown herein controlling luminaires in a serial manner (one at a time), it would be understood that in some embodiments the luminaires are controlled in a parallel manner such that where there are multiple locations of light intensity differences that the luminaires receive the control parameters at substantially the same time.

Figure 2:
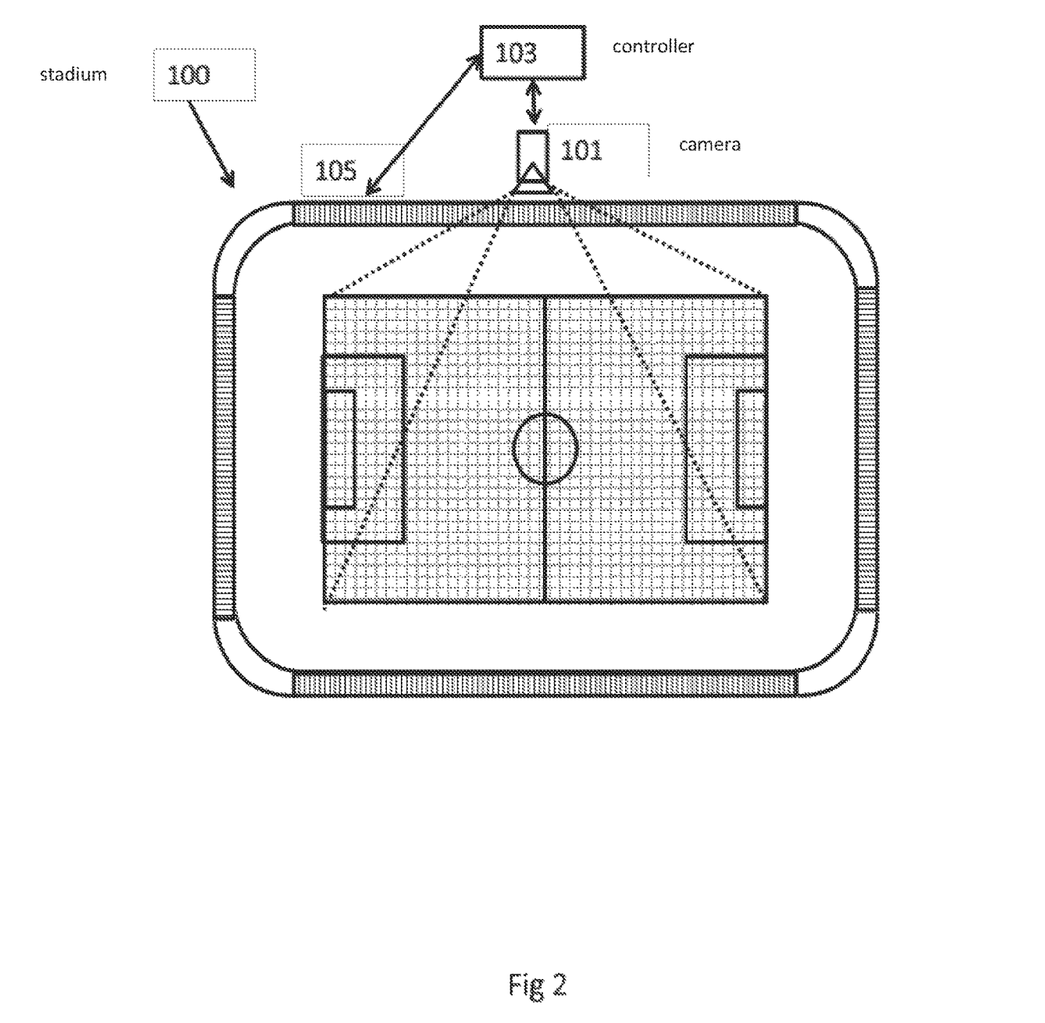
FIG. 2 shows schematically an example lighting system comprising a single camera operating as a light intensity sensor according to some embodiments.
Figure 3:
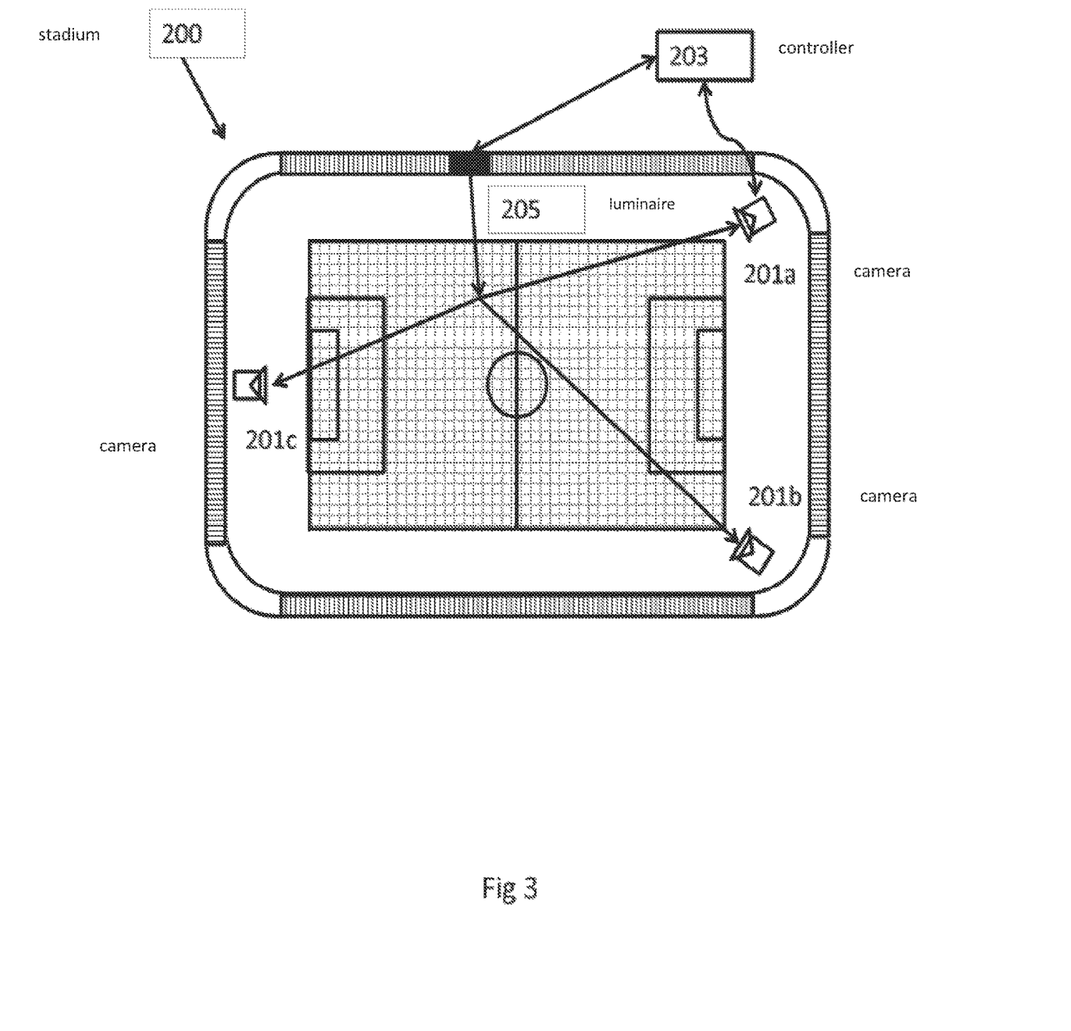
FIG. 3 shows schematically an example lighting system comprising multiple cameras operating as a light intensity sensor according to some embodiments.
Figure 4:
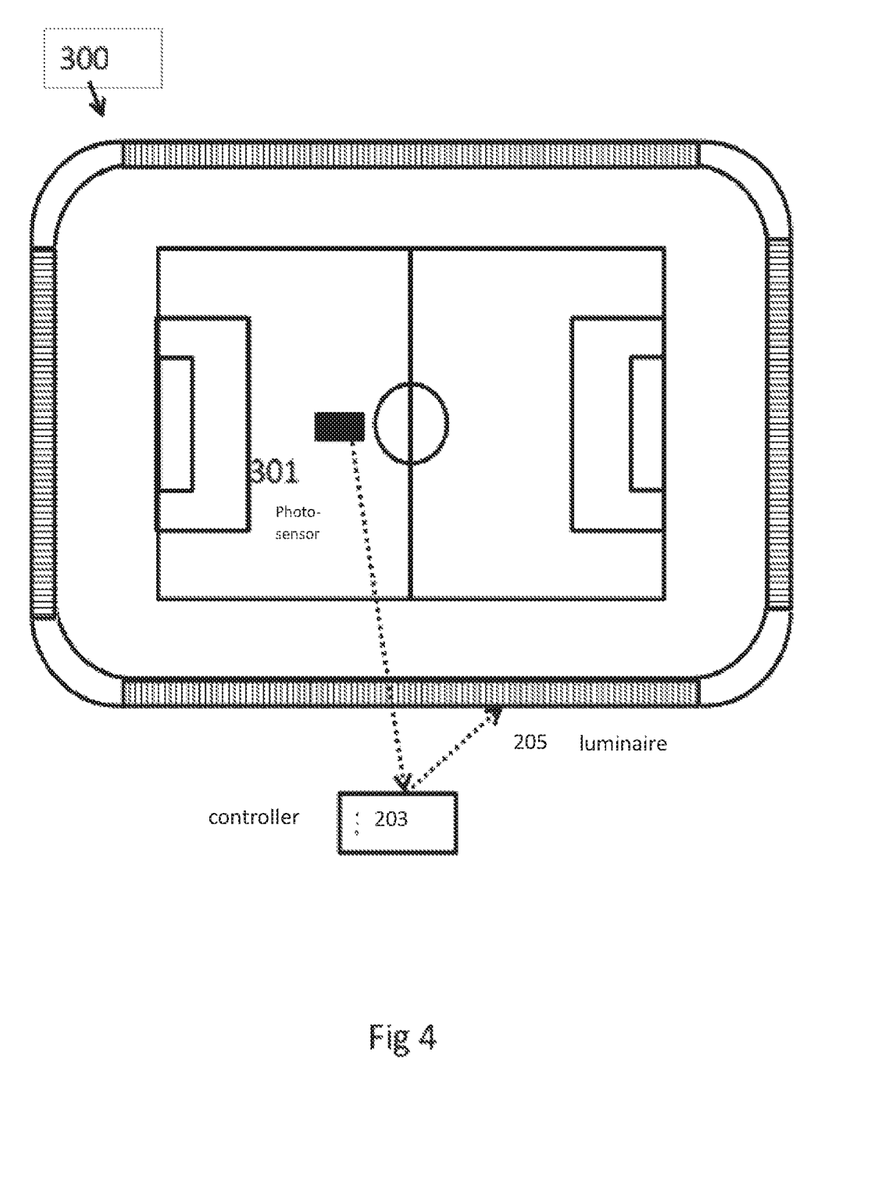
FIG. 4 shows schematically an example lighting system comprising a photosensor operating as a light intensity sensor according to some embodiments.

With respect to FIGS. 2 to 4 various optical sensor configurations are shown implemented within a lighting system such as shown in FIG. 1. FIG. 2, for example shows a lighting system where the at least one sensor is implemented using an overhead camera 101. The camera 101 may be any suitable camera or imaging means configured to capture an image and pass the image to the controller 3. FIG. 2 shows the stadium 100 within which the pitch or field (in this example a football pitch) and the camera 101 is located substantially overhead. The camera 101 may in some embodiments be coupled a fixed position or movable jig. In the example shown in FIG. 2 the camera 101 is configured to capture an image of the pitch or field area. Preferably the field of view of the camera 101 is such that the centre of the image captured by the camera is the centre point or spot of the field. The camera 101 furthermore may be configured with lenses or optics to enable an adjustment of the field of view of the camera such as a zooming operation such that the camera is configured to capture a first image or set of images at a first zoom level with a wider field of view to enable coarse control, and a second image or set of images at a second zoom level with a narrower field of view to enable fine control. The overhead camera image comprises pixel data which determines or defines light intensity values for locations on the field or pitch. In some embodiments the image may be processed either before or at the controller 3. For example in some embodiments the image is processed to extract only the luma values, which define a black and white brightness value. It would be understood that the use of black of white brightness (or black or white intensity) values may be implemented where the stadium lighting is generated over multiple surfaces like in an athletics stadium. In such embodiments by converting to black-and-white intensity values the differences produced by the effect of the various surfaces' reflection coefficients are reduced. Furthermore in some embodiments the pixel data may be combined to produce a light intensity value for a region rather than a single pixel location. For example as shown in FIG. 2 the pitch or field may be divided into a grid of locations and the pixel values associated with each grid element are combined to produce a grid or array of light intensity values. These light intensity values may then be passed to the controller 103.

The controller 103 may receive the grid or array light intensity values and determine the light intensity differences. For example the controller 103 may be configured to select neighbouring or adjacent grid element pairs and determine light intensity differences between pairs of intensity values. However, as described herein, it would be understood that the determination of the light intensity difference values may be based on any suitable scheme or method. For example the light intensity difference value may be determined by calculating the total light intensity difference between a location and all of the neighbouring grid elements.

The controller 103 may then be configured to identify a suitable luminaire from the lighting plan and generate (adjust) a control parameter associated with the luminaire. For example the controller may identify and select the luminaire associated with the brighter location and generate a control parameter to dim the selected luminaire. The luminaire selected 105 may then receive the control parameter and dim the light intensity generated.

In some embodiments these operations may be repeated or looped until the light intensity difference value between the pair of neighbouring light intensity values is below a determined threshold value. Furthermore in some embodiments these operations may then be repeated or looped for further locations until all of the locations or areas have light intensity differences below the determined threshold value. It would be understood that the threshold value may have a directional bias. In some embodiments the operations may be performed or additionally performed for non neighbouring locations groups or against a reference or absolute value until a stadium wide light intensity difference value is also below a determined threshold value.

With respect to FIG. 3 a further example of the lighting system is shown wherein the at least one sensor is implemented by multiple cameras positioned at different locations throughout the stadium and configured to capture images of the stadium from different viewpoints and therefore different directions. FIG. 3 shows the stadium 200, which is similar to the stadium 100, but comprises three cameras. A first camera 201a is located behind one of the corners of the pitch or field, a second camera 201b is located behind an adjacent corner of the pitch, and a third camera 201c is located behind the opposing end of the pitch. Each of these cameras 201a, 201b, 201c may be configured to capture images and send these to the controller 203. Each image may be of the whole or part of the pitch (or stadium) and be configured so that at least two of these cameras capture images which overlap in coverage. The cameras 201a, 201b, 201c may be configured with similar optics or lenses as described with respect to the camera 101 and furthermore process the image data prior to sending it to the controller in a similar manner as described herein.

The controller 203 is configured to receive the images from the cameras 201a, 201b, 201c. Having knowledge of the location of the cameras 201a, 201b, 201c and the field of view of the cameras 201a, 201b, 201c the controller 203 may be configured to map light intensity values for locations in the stadium from the pixel intensity (or groups of pixel intensity) values within the images. Furthermore the controller 203 may determine from the overlapping field of views locations where there are multiple light intensity values. In some embodiments the multiple light intensity values may be combined to produce an average light intensity value, or scalar value. This combination may be any suitable combination, such as a linear combination, a weighted contribution combination, a square or logarithmic combination. In some embodiments this combination is to generate a vector value wherein each component of the vector is the light intensity value for the position as determined by a camera (or from a direction defined by the camera location).

Having determined light intensity values for locations in the stadium the controller may then apply methods similar to those described herein to determine light intensity difference values. In some embodiments where the light intensity value is a vector value then the light intensity difference values may also be vector values with directional components. For example for a location A the first camera could determine an intensity value of Xa, the second camera could determine an intensity value of Ya, and the third camera could determine an intensity value Za, whereas at the location B the first camera could determine an intensity of Xb, the second camera could determine an intensity value of be Yb and the third camera could determine an intensity value of Zb. Examples of light intensity differences between the two locations could be a scalar value $D=(Xa-Xb)+(Ya-Yb)+(Za-Zb)$ or a vector value $D=(Xa-Xb),(Ya-Yb),(Za-Zb)$. It would be understood that the generation of the scalar value improves the control process as it produces an averaging of the intensity values as experienced from various directions or locations and is therefore not limited to sensing errors from a single viewpoint.

The controller having generated a light intensity difference value may then use the light intensity difference value and the knowledge of the locations in the stadium over which the light intensity difference occurs, and the knowledge of the lighting plan or information based on the lighting plan to select a suitable luminaire to be controlled. The generation of a vector value light intensity difference value may furthermore be used to choose or select a suitable luminaire. As typically there will be multiple luminaire at various locations with directions aiming at the same location or spot in the stadium the directional nature of the light intensity difference value may enable the controller to select a luminaire generating light in a specific direction in order to attempt to correct a light intensity difference occurring in a specific direction or axis.

The controller 203 having chosen a suitable luminaire 205 may then generate a suitable control parameter to be output to the luminaire to adjust the output of the luminaire and therefore attempt to minimise or reduce the light intensity difference value. This is shown in FIG. 3 by the controller 203 communicating the selected luminaire 205 aimed at one of the locations being monitored by the cameras.

In the examples described herein with respect to the use of a camera or cameras to generate light intensity values it would be understood that in some situations the light intensity values may be determined by placing a reflective marker or apparatus at locations within the stadium and determining the light reflected of the reflective marker or apparatus. For example in some embodiments a mannequin (with a determined reflectance) is positioned at locations within the stadium. Light reflected off the mannequin is captured by the camera and a light intensity value based on the light reflected from the marker is determined. In such a way it is possible to control light intensity homogeneity from more than the surface reflection and therefore able to determine both surface level light intensity differences and above surface level light intensity differences.

With respect to FIG. 4 a further example of the lighting system is shown wherein the sensor configured to determine light intensity values for multiple locations within the stadium is implemented by a photosensor 301 located on or over the stadium surface. The photosensor 301 may be configured to generate a suitable light intensity value at a defined location and output this value to the controller 303. In the example shown in FIG. 4 a single photosensor 301 is shown positioned at a single location. In such embodiments the photosensor 301 is configured to determine light intensity values for multiple locations within the stadium by moving the photosensor from location to location. For example the photosensor may be fixed to a structure which may be moved over the surface of the stadium to gather light intensity values for stadium. The surface of the stadium may be the playing area, such as the field or track or pool surface, but may also include or define the seating area or other areas within the stadium. It be understood that these locations may be spaced horizontally. In other words the differences determined across an X-Y plane. In some embodiments the locations may be spaced vertically. In other words the locations are distributed with difference in the Z axis. The locations may be separated by both horizontal and vertical displacement to define a volume over which the variability of lighting intensity values may be monitored rather than an area. In such embodiments the photo-sensor or photodetector may be any suitable type of photo-sensors such as photodiodes, photoresistors or light dependent resistors (LDR) which change resistance according to light intensity, photovoltaic cells which produce a voltage and supply an electric current when illuminated, and phototransistors. In some embodiments the motion of the photosensor may be automated or semi-automated by mounting the photosensor on a movable jig, wheeled apparatus or tracked apparatus and moving the jig or apparatus from location to location and controlled either autonomously or remotely. In some embodiments the movable jig or apparatus is further equipped with suitable position or location estimating means to correctly locate itself within the stadium. For example the photosensor may be mounted on a wheeled apparatus equipped with GPS position locating means and be configured to move from location to location transmitting the light intensity values associated with each location. Although the sensor may be implemented as a non-directional sensor, in some embodiments the photosensor is a directional photosensor or photosensor within a slotted housing to produce a directional light intensity value output. In some embodiments multiple photosensors are employed at the various locations wished to be monitored. For example in some embodiments a net or mesh is located over the surface of the stadium pitch, the net or mesh having photosensors arranged at defined positions within the net or mesh in order to provide suitable light intensity values at defined locations.

Figure 5:
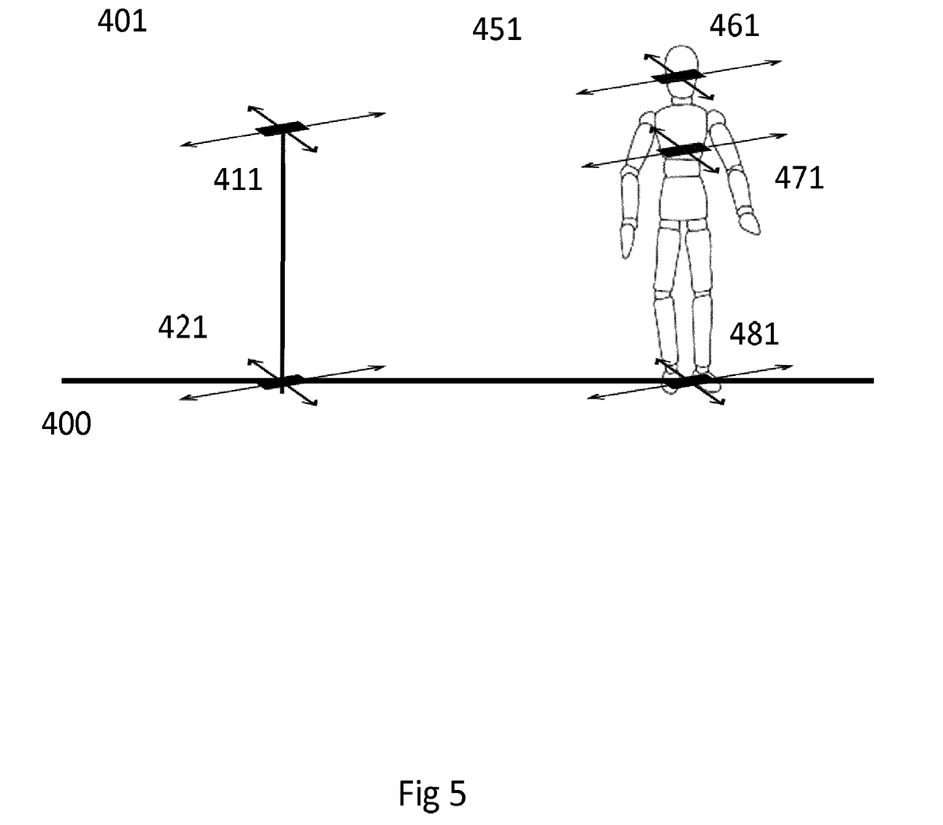
FIG. 5 shows schematically example photosensor mountings according to some embodiments.

With respect to FIG. 5 example photosensor apparatus is shown. In a first example photosensors arranged on a suitable structure or jig 401. The structure or jig 401 has mounted on it a first group of photosensors 411 at a defined height above the surface and with four directional components in the X-Y plane, and a second group of photosensors 421 located at the surface level and with four directional components in the X-Y plane. Although the group of photosensors 411, 421 are shown having directional components in the X-Y plane it would be understood that the photosensors may have any suitable directional component including a Z component. Furthermore FIG. 5 shows a second example photosensor apparatus 451. The second example apparatus 451 is a dummy or mannequin with photosensors 461 located at head height, photosensors 471 located at chest height and photosensors 481 located on the surface 481. In such a manner the light intensity values for regions 'experienced' by the observer may be generated. It would be understood that the photosensors may be located at any suitable height on the mannequin.

As shown herein in some embodiments the photo-sensors may be located on a structure at different heights to permit light intensity values for vertical and/or horizontal locations and therefore enable control of light intensity homogeneity for a volume of space rather than over an area to be performed.

It is understood that in some embodiments that more than one type or arrangement of sensor may be combined to provide suitable light intensity values. For example photosensors may be combined with camera image light intensity values, or the camera mounted over the stadium light intensity values may be combined with the light intensity values from multiple other cameras mounted around the stadium (or may be considered to be one of the multiple cameras mounted around the stadium).

Figure 6:
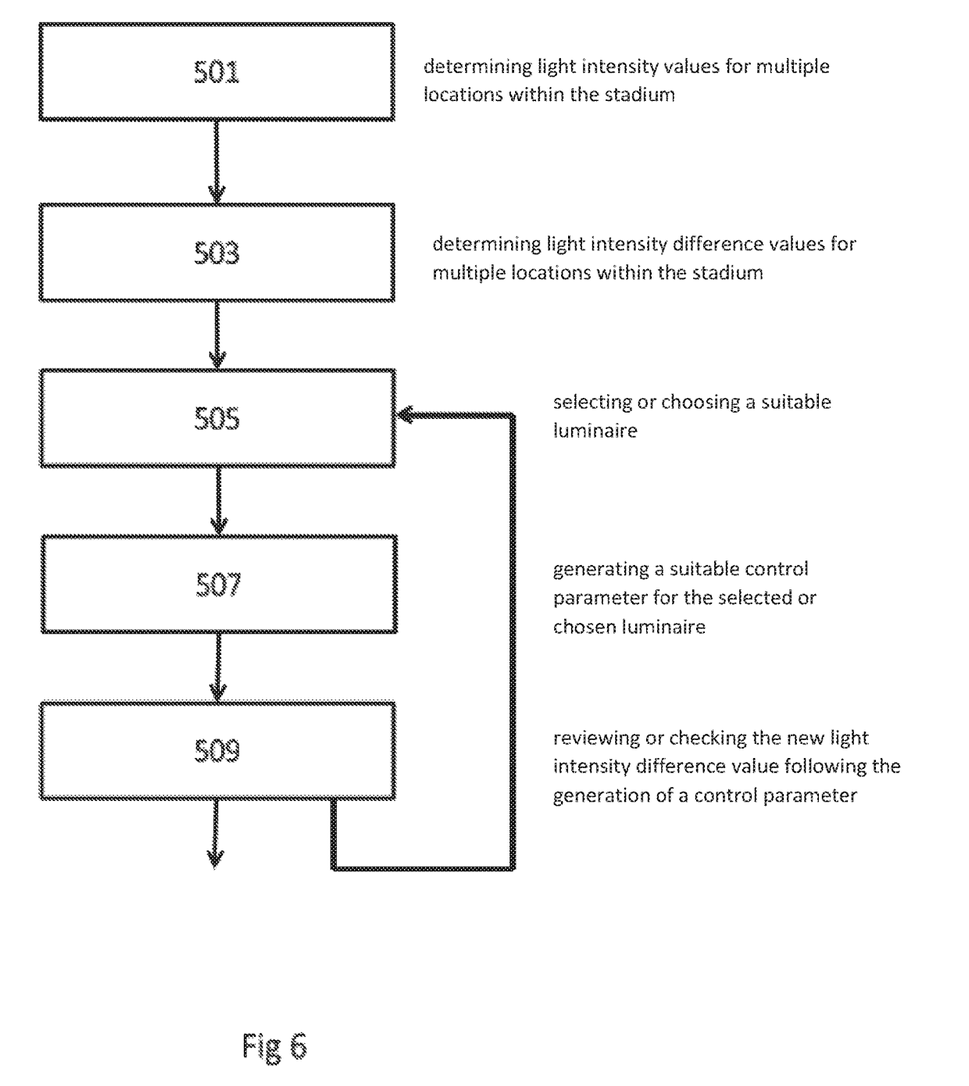
FIG. 6 shows a flow diagram of a method of controlling the lighting system as shown with respect to FIGS. 1 to 5 according to some embodiments.

With respect to FIG. 6 a flow diagram showing a first lighting system homogeneity control method implementing some embodiments is shown.

The at least one sensor may be configured to determine light intensity values for multiple locations within the stadium.

The operation of determining light intensity values for multiple locations within the stadium is shown in FIG. 6 by step 501.

The controller may be configured to receive the light intensity values for multiple locations within the stadium and from these light intensity values generate light intensity difference values.

The operation of determining light intensity difference values for multiple locations within the stadium is shown in FIG. 6 by step 503.

The controller may then select or choose a suitable luminaire based on the multiple locations and the light intensity difference values.

The operation of selecting or choosing a suitable luminaire is shown in FIG. 6 by step 505.

The controller may then generate a suitable control parameter for the selected electronically controllable luminaire based on the light intensity difference value in order to reduce the light intensity difference between the multiple locations. As described herein the light intensity difference value may be a local difference value or an area or stadium wide difference value. The control parameter may then be output to the luminaire or to a controller coupled to the luminaire to adjust an operational parameter of the luminaire.

The operation of generating a suitable control parameter for the selected or chosen luminaire is shown in FIG. 6 by step 507.

The controller in some embodiments may then implement a check or review operation wherein the controller receives new light intensity values for the multiple locations, generates a light intensity difference value and determines whether or not the light intensity difference value is within a determined threshold.

The operation of reviewing or checking the new light intensity difference value following the generation of a control parameter is shown in FIG. 6 by step 509.

When the new light intensity difference value is within a determined threshold then the controller may stop or repeat the operations for the next locations (or next area) to be monitored.

When the new light intensity difference value is greater than the threshold then the controller may repeat or loop back to choose a luminaire based on the locations and the difference value and further generate an additional control parameter to further attempt to reduce or minimise the light intensity difference value based on the light intensity values from the multiple locations. In other words in some embodiments the method loops back or links to step 505 and then performs steps 507 and 509.

Figure 7:
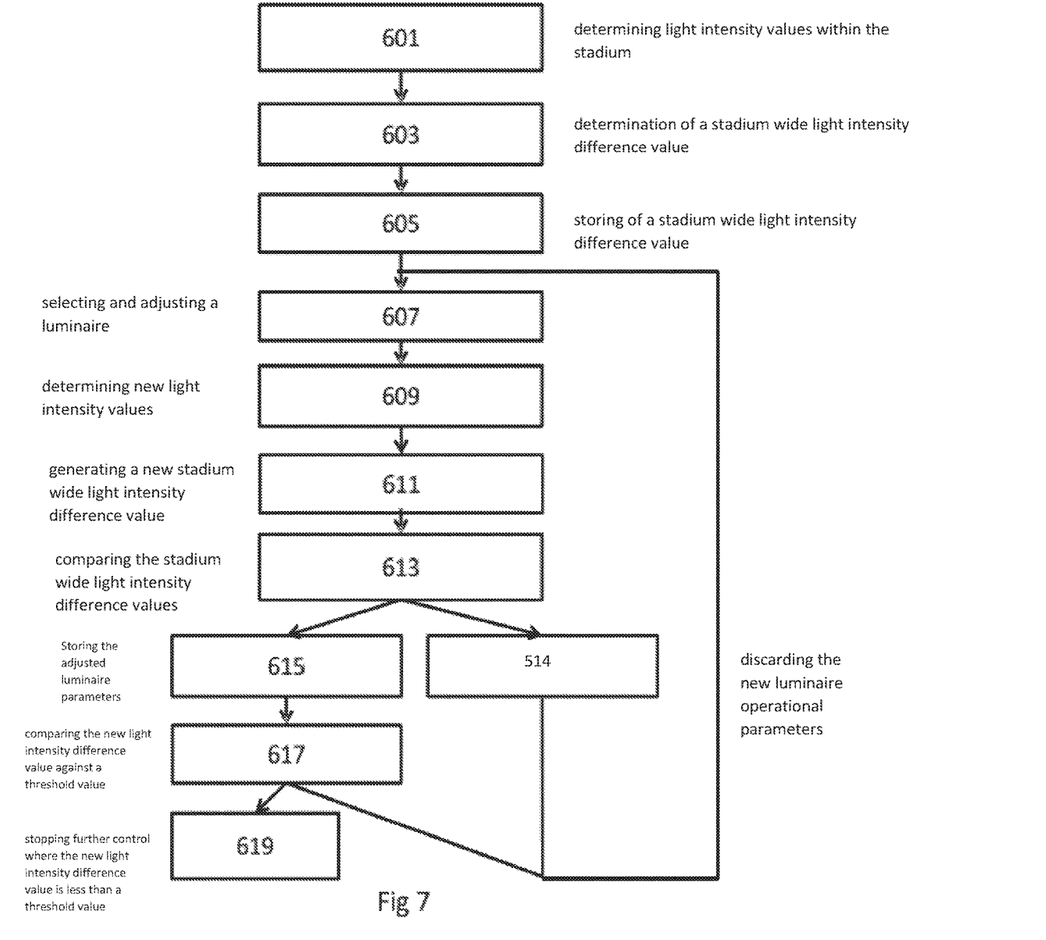
FIG. 7 shows a flow diagram of a further method of controlling the lighting system as shown with respect to FIGS. 1 to 5 according to some embodiments.

With respect to FIG. 7 a further flow diagram showing a further method of controlling lighting system homogeneity on a stadium wide basis shown.

The at least one sensor may be configured to determine light intensity values for the multiple locations within the stadium. In this example the at least one sensor is configured to determine light intensity values for a range of locations within the stadium to effectively produce a light intensity map for the stadium.

The operation of determining light intensity values within the stadium is shown in FIG. 7 by step 601.

The controller having received the light intensity values to produce a light intensity map for the stadium is configured to determine a stadium light intensity difference value. The stadium light intensity difference value may be generated by determining differences in light intensity values against an absolute light intensity value for each location and then combining the absolute differences. In such a way the difference in value is relative to an absolute value rather than a relative value.

The determination of a stadium wide light intensity difference value is shown in FIG. 7 by step 603.

The stadium wide light intensity difference value is then stored.

The storing of a stadium wide light intensity difference value is shown in FIG. 7 by step 605.

The controller may then be configured to choose or select a luminaire. The chosen or selected luminaire is then 'read' to determine its current operational parameters and the controller generates a control parameter to adjust the current operational parameter. In some embodiments the choosing or selecting of the luminaire is performed based on the lighting plan or information based on the lighting plan, however any suitable selection method or algorithm may be employed.

The operation of selecting and adjusting a luminaire is shown in FIG. 7 by step 607.

The selected luminaire receives the control parameter and adjusts its operational parameters based on the control parameter. Furthermore the at least one sensor then determines new light intensity values based on the adjusted luminaire operational parameters. These new light intensity values may be passed to the controller.

The operation of determining new light intensity values following the adjustment of a luminaire is shown in FIG. 7 by step 609.

The controller may then be configured to generate a new stadium wide light intensity difference value based on the new light intensity values.

The operation of generating a new stadium wide light intensity difference value is shown in FIG. 7 by step 611.

The controller may then compare the new stadium wide light intensity difference value against the previous light intensity difference value. New line the operation of comparing the stadium wide light intensity difference values is shown in FIG. 7 by step 613.

Where the new light intensity difference value is lower than the previous light intensity difference value (in other words there has been a general improvement in light intensity homogeneity) then the adjusted luminaire parameters are stored.

The storing of the adjusted luminaire parameters is shown in FIG. 7 by step 615.

The controller may then compare the new light intensity difference value and determine whether it is lower than the determined threshold for stopping further control.

The operation of comparing the new light intensity difference value against a threshold value is shown in FIG. 7 by step 617.

When the new light intensity difference value is less than the threshold value then the operation or controller may stop further control operations (in other words the lighting system has achieved a defined level of homogeneity).

The operation of stopping further control where the new light intensity difference value is less than a threshold value is shown in FIG. 7 by step 619.

When the new light intensity difference value is greater than the threshold value then a further selection and adjustment operation may be performed. In other words the operation loops back to step 607.

When the new light intensity difference value is greater than the previous light intensity difference value then the controller may discard the new adjusted luminaire parameters and/or re-adjust the luminaire operational parameters to the previous luminaire parameters.

The operation of discarding the new luminaire operational parameters is shown in FIG. 7 by step 514.

The operation may then loopback to step 607 where a further selection and adjustment operation may be performed.

Furthermore in general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope. In the device claim enumerating several means, several of these means may be embodied by one and the same item of hardware. The mere fact that certain measures are recited in mutually different dependent claims does not indicate that a combination of these measures cannot be used to advantage. Furthermore in the appended claims lists comprising "at least one of: A; B; and C" should be interpreted as (A and/or B) and/or C.

The invention claimed is:

1. A light system for a stadium, the light system comprising:
   at least one sensor configured to determine light intensity values for multiple locations within the stadium;
   multiple electronically controllable luminaires, wherein at least one electronically controllable luminaire is configured to generate light directed towards at least one location of the multiple locations within the stadium based on a received control parameter;
   a controller configured to receive the light intensity values from the at least one sensor, further configured to determine a light intensity difference based on the light intensity values from the multiple locations within the stadium, and configured to select the at least one electronically controllable luminaire and generate the control parameter for the at least one electronically controllable luminaire based on the light intensity difference to attempt to reduce the light intensity difference;
   wherein the at least one sensor comprises at least two cameras, each camera located at a different known position within the stadium and configured to view the multiple locations from different viewing orientations such that each camera is configured to determine a light intensity value directional component for each location;

wherein the light intensity value for each location comprises at least two directional components representing the light intensity as sensed from two separate directions respectively, and the light intensity difference is based on a difference between a combination of the light intensity values for each location from each direction.

2. The light system as claimed in claim 1, wherein the light intensity difference is an area or volume light intensity difference generated by combining the light intensity differences between pairs of light intensity values.

3. The light system as claimed in claim 1, wherein the combination of the light intensity values for each location from each direction comprises:
   a linear or non-linear combination of the light intensity values for each location to generate a single light intensity value for each location;
   an appending of the light intensity values for each location to generate an array of light intensity value directional components for each location.

4. The light system as claimed in claim 1, wherein the multiple locations within the stadium are separated by at least one of:
   a horizontal distance;
   a vertical distance.

5. The light system as claimed in claim 1, wherein the at least two cameras comprises a camera mounted substantially over a stadium pitch surface, wherein the camera is configured to capture an image of at least part of the stadium containing the multiple locations, and wherein the image comprises a light intensity value for each location.

6. The light system as claimed in claim 1, wherein the at least one sensor comprises at least one of:
   at least two photo-sensors located on a structure at different heights and configured to determine light intensity values for at least two locations separated by a vertical distance within the stadium; and
   at least two directionally orientated photo-sensors located on the same horizontal plane on a mannequin, the mannequin being configured to be moved on the surface of the stadium between the multiple locations and the photo-sensors being configured to determine directional light intensity values for multiple locations separated by a horizontal distance within the stadium.

7. The light system as claimed in claim 1, wherein the controller comprises a memory configured to store an identity or address of the at least one electronically controllable luminaire and at least one parameter associated with the at least one electronically controllable luminaire, wherein the at least one parameter associated with the at least one electronically controllable luminaire comprises at least one of:
   current location of the at least one electronically controllable luminaire;
   current dim level of the at least one electronically controllable luminaire;
   current direction of beam of the at least one electronically controllable luminaire; and
   current width of beam of the at least one electronically controllable luminaire, and wherein the controller is configured to generate the control parameter for the least one electronically controllable luminaire based on the light intensity difference and the at least one parameter associated with the at least one electronically controllable luminaire.

8. The light system as claimed in claim 7, wherein the controller is configured to output the control parameter for the at least one electronically controllable luminaire based on the identity or address of the at least one electronically controllable luminaire.

9. The light system as claimed in claim 1, wherein the controller is configured to receive further light intensity values from the at least one sensor after generating the control parameter, to determine an additional light intensity difference based on the further light intensity values from the multiple locations within the stadium, and generate a further control parameter for the least one electronically controllable luminaire or a control parameter for a further electronically controllable luminaire based on the additional light intensity difference to reduce the light intensity difference based on the light intensity values from the multiple locations, and to repeat the further receiving, further determining and generating until the additional light intensity difference is below a threshold value.

10. A method for controlling a light system for a stadium, the method comprising:
    determining light intensity values for multiple locations within the stadium using at least one sensor;
    determining a light intensity difference based on the light intensity values from the multiple locations within the stadium;
    selecting at least one electronically controllable luminaire and generating at least one control parameter for at least one electronically controllable luminaire based on the light intensity difference;
    generating light directed towards at least one location of the multiple locations based on the at least one control parameter using at least one electronically controllable luminaire, wherein the at least one control parameter is generated to attempt to reduce the light intensity difference based on the light intensity values from the multiple locations;
    wherein determining the light intensity values comprises determining at least two directional components for each location, each directional component representing the light intensity as sensed from a separate direction, and wherein determining the light intensity difference comprises determining a light intensity difference based on a difference between a combination of the light intensity values for each location from each direction.

11. The method as claimed in claim 10, wherein determining the light intensity difference comprises determining an area or volume light intensity difference by combining the light intensity differences between pairs of light intensity values.

12. The method as claimed in claim 10, wherein the combination of the light intensity values for each location from each direction comprises:
    generating a linear or non-linear combination of the light intensity values for each location in order to generate a single light intensity value for each location;
    appending of the light intensity values for each location in order to generate an array of light intensity value directional components for each location.

* * * * *